United States Patent [19]
Lee

[11] Patent Number: 5,430,640
[45] Date of Patent: Jul. 4, 1995

[54] POWER SUPPLY

[75] Inventor: Chang-U Lee, Suwon, Rep. of Korea

[73] Assignee: Samsung Electro-Mechanics Co., Ltd., Suwon, Rep. of Korea

[21] Appl. No.: 55,227

[22] Filed: Apr. 28, 1993

[30] Foreign Application Priority Data

Apr. 30, 1992 [KR] Rep. of Korea ............. 92-7306
Apr. 26, 1993 [KR] Rep. of Korea ............. 93-6961

[51] Int. Cl.⁶ .................................. H02M 7/217
[52] U.S. Cl. ........................ 363/127; 363/20; 363/41; 363/45
[58] Field of Search ............ 363/20, 21, 127, 41, 363/45, 97, 89

[56] References Cited
U.S. PATENT DOCUMENTS

| | | | |
|---|---|---|---|
| 5,066,900 | 11/1991 | Bassett | 363/20 X |
| 5,126,651 | 6/1992 | Gauen | 363/127 X |
| 5,144,547 | 9/1992 | Masamoto | 363/127 |

Primary Examiner—A. D. Pellinen
Assistant Examiner—Y. Jessica Han
Attorney, Agent, or Firm—Ladas & Parry

[57] ABSTRACT

A power supply for use in electronic apparatuses is disclosed, and the power supply is provided with a switching control circuit for controlling the switching operations of a switching device of a rectifying portion, thereby making the switching device more efficiently operate. In the case where an over-voltage is supplied, the switching device is prevented from being damaged. There is added a tertiary coil in the transformer for inducement of a voltage, and a switching circuit is added to it, so that the switching control circuit should be switched in synchronization with a main MOS transistor which is connected to a primary coil of the main transformer. Thus, the switching operations of the switching device is made more efficient, and the switching device is protected, as well as making it possible to carry out a high density design. Therefore the power supply can be applied to all kinds of electronic apparatuses.

4 Claims, 5 Drawing Sheets

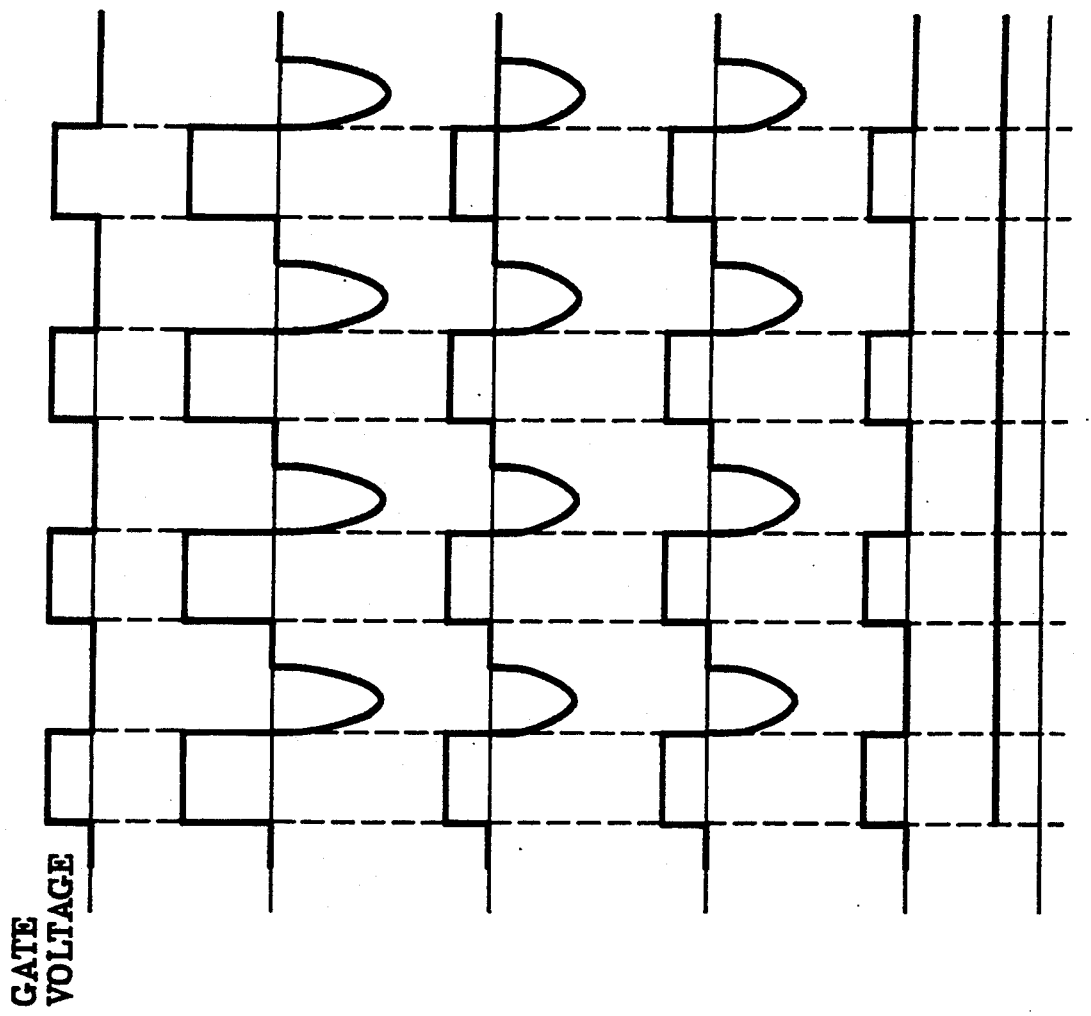

POWER SUPPLY

FIELD OF THE INVENTION

The present invention relates to a power supply in which a rectifying circuit in the power supply is provided with a switching control section, so that the switching operations of a switching device can be accurately carried out, and that the switching device due to a surge of an over-voltage can be prevented from being damaged.

BACKGROUND OF THE INVENTION

A conventional power supply which is used in an electronic apparatus includes a rectifying circuit and a flattening circuit for converting the supplied power to a DC power of a predetermined value which is suitable for the electronic apparatus. Further, the power supply is constituted such that it is provided with a pulse width modulator for controlling the switching device of the power supply so as to maintain at a predetermined level, and that the duty of the output pulse of the pulse width modulator is adjustable.

FIG. 1 illustrates a circuit of a conventional forward type power supply.

Referring to FIG. 1, the circuit includes a power supply portion 10, a rectifying portion 20 and a filtering portion 30.

The power supply portion 10 is constituted such that: a power supply terminal is connected to one end of a primary coil of a transformer T1 so as to supply a power source voltage Vin; and the other end of the primary coil is connected to a MOS transistor Q1 so that the induction of the power source voltage Vin through the primary coil of the transformer T1 to the secondary coil can be controlled. Further, the gate of the MOS transistor Q1 is connected to a pulse width modulator 12 for outputting pulses to control the turning-on or off of the transistor Q1, while the secondary coil of the transformer T1 coupled with the primary coil, for inducing the power of the primary coil to the secondary coil.

Meanwhile, the rectifying portion 20 is constituted such that the voltage which is induced from the primary coil to the secondary coil of the transformer T1 is rectified through a rectifying diode D1. Further, the voltage is connected with a free wheeling diode D2 for inducing an inverse voltage, when the output from the pulse width modulator 12 is a low signal. The input terminal of the free wheeling diode D2 is grounded.

Meanwhile, the filtering portion 30 includes a smoothing filter which consists of a filter coil L1 and a filter capacitor C1.

Now the operations of the circuit constituted as above will be described. Here, the power source voltage is a DC voltage.

The pulse width modulator 12 supplies high signals and low signals to the gate of the MOS transistor Q1 at predetermined intervals.

When the output signal from the pulse width modulator 12 is high, the MOS transistor Q1 is turned on, so that the voltage Vim supplied through the power supply terminal is induced to the the secondary coil through the primary coil.

The induced voltage is supplied to the rectifying diode D1 to be rectified by it, and then, the rectified voltage is filter by the coil L1 and by the capacitor C1 of the filter portion 30, before being output.

Therefore, a loop is formed through the transformer T1, the rectifying diode D1, the flattening coil L1, the filter capacitor C1 and the transformer T1.

When the pulse width modulator 12 outputs a low signal, the MOS transistor Q1 is turned off, and therefore, the power source voltage Vin which is supplied through the power supply terminal cannot be supplied to the transformer T1, while an inverse voltage is induced in the secondary coil of the transformer T1, and the rectifying diode D1 is turned off. Therefore, the voltage which remains in the coil L1 is flattened by the filter coil, and is output through a power output terminal.

Therefore, a loop is formed through the filter coil L1, the filter capacitor C1, and the free wheeling diodes D2, thereby rectifying the voltage.

In the case where the above circuit is formed, a power loss occurs as much as the diode forward drop voltage due to the existence of the diodes D1 and D2. The diode forward drop voltage refers to the minimum voltage which is required to drive the diode.

Further, the elements are over-heated by the lost power, and in order to prevent the over-heating of the elements, a heat sink is provided. Consequently, the bulk of the circuit is increased, and the manufacturing cost is also increased.

FIG. 2 illustrates another form of conventional rectifying circuits. Referring to FIG. 2, the parts which are same as those of FIG. 1 are omitted as to the description of its operating feature, and the same elements are assigned with the same reference codes.

In order to give solutions to the problems of the circuit of FIG. 1, the rectifying diode D1 and the free wheeling diode D2 of the circuit of FIG. 2 are replaced with MOS transistors Q2 and Q3. As the transistors causing a low power loss, MOS transistors and bipolar transistors are widely used. However, in the case of the bipolar transistors, the switching speed is slower than the MOS transistors, and therefore, they cannot be used in a power supply. Accordingly, transistors are used in a power supply.

Further, the gate of the MOS transistor Q2 is disposed adjacently to the primary coil of the transformer T1, and a tertiary coil is added so as for the power of the primary coil of the transformer T1 to be induced on the tertiary coil, thereby controlling the switching operation of the MOS transistor Q2.

Further the gate of the MOS transistor Q3 is connected to an auxiliary coil T2, so that the coil T2 should be able to control the switching operations of the MOS transistor Q3 by power through the induction from a filter coil L1.

Referring to the above circuit, the operations which are different from that of the circuit of FIG. 1 will be described.

When the output pulse signal of the pulse width modulator 12 is high, the power source voltage Vim which is input through a power supply terminal is induced from the primary coil to the tertiary coil of the transformer T1. This induced voltage turns on the MOS transistor Q2.

Therefore, a loop is formed through the transformer T1, the flattening coil L1, the filter capacitor C1 and the MOS transistor Q2.

When the output pulse signal of the pulse width modulator 12 is low, the switching MOS transistor Q1 is turned off, so that the voltage supplied through the power supply terminal is not supplied to the transformer T1, but that an inverse voltage is induced on the secondary coil of the transformer T1, thereby turning off the MOS transistor Q2.

Under this condition, the energy which remains in the coil L1 is induced to the auxiliary coil T2 which is disposed adjacently to the coil L1. This induced voltage is supplied to the gate of the MOS transistor Q3 to turn on the OS transistor Q3.

Accordingly, there is formed a loop through the filter coil L1, the filter capacitor C1 and the MOS transistor Q3.

However, in the case of the above circuit, the power loss caused by the rectifying diode D1 and the free wheeling diode D2 can be reduced. However, if the voltage which is supplied to the tertiary coil of the transformer T1 becomes higher than the tolerant voltage of the MOS transistor Q2, the MOS transistor Q2 is destroyed.

Therefore, if this problem is to be solved, there has to be provided a device which is capable of blocking the voltage, when the voltage which is supplied to the gate of the MOS transistor Q2 is higher than the tolerant voltage of the MOS transistor Q2. That is, when the induced voltage is higher than the tolerant voltage of the MOS transistor Q2, this voltage has to be blocked by providing an over-voltage blocking portion which consists of a zener diode and a heat releasing device.

In the case where the above circuit is formed, if the equivalent impedance of the output load is high, the energy existing in the filter coil L1 is very small. Consequently, the energy which is supplied to the gate of the MOS transistor Q3 through the auxiliary coil T2 is very small, and therefore, the MOS transistor Q3 cannot perform the switching operations. Further, In the case where the equivalent impedance of the output load is low, the energy which exists on the flattening coil L1 becomes very large, and consequently, the energy which is supplied to the gate of the MOS transistor Q3 through the auxiliary coil T2 becomes very large, with the result that a voltage which is higher than the tolerant voltage of the MOS transistor Q3 is supplied, thereby destroying the MOS transistor Q3.

SUMMARY OF THE INVENTION

The present invention is intended to overcome the above described disadvantages of the conventional techniques.

Therefore it is an object of the present invention to provide a power supply in which a switching control portion is provided for controlling the operations of a switching device of a rectifying circuit, so that the switching operations of the switching device should be carried out in an accurate manner, and that the switching device due to the surge of an over-voltage can be prevented from being destroyed.

In achieving the above object, the power supply according to the present invention includes: a power supplying portion consisting of a pulse width modulator and a transformer for supplying input power; a rectifying portion consisted of first and second main switching devices, for rectifying the supplied power from the power supplying portion; a control portion for controlling the rectifying portion; and a filtering portion for smoothing the rectified voltage, whereby the input power is converted to a DC power of a predetermined level.

The power supply according to the present invention is further characterized in that the control signals which controls the first and second switching devices of the rectifying portion function in such a manner that a predetermined voltage level is maintained.

BRIEF DESCRIPTION OF THE DRAWINGS

The above object and other advantages of the present invention will become more apparent by describing in detail the preferred embodiment of the present invention with reference to the attached drawings in which:

FIG. 6 illustrates wave patterns of the output of the principal parts of FIGS. 3, 4 and 5, in which: FIG. 6A illustrates a wave pattern of the output of the pulse width modulator; FIG. 6B illustrates a wave pattern of the input voltage supplied to the primary coil of the transformer; FIG. 6C illustrates a wave pattern of the voltage induced on the secondary coil of the transformer; FIG. 6D illustrates a wave pattern of the voltage induced on the tertiary coil of the transformer; FIG. 6E illustrates a wave pattern at a point A in the auxiliary rectifying portion of FIGS. 3 to 5; and FIG. 6F illustrates a wave pattern at a point B in the auxiliary rectifying portion of FIGS. 3 to 5.

DESCRIPTION OF THE PREFERRED EMBODIMENT

Figure 3:
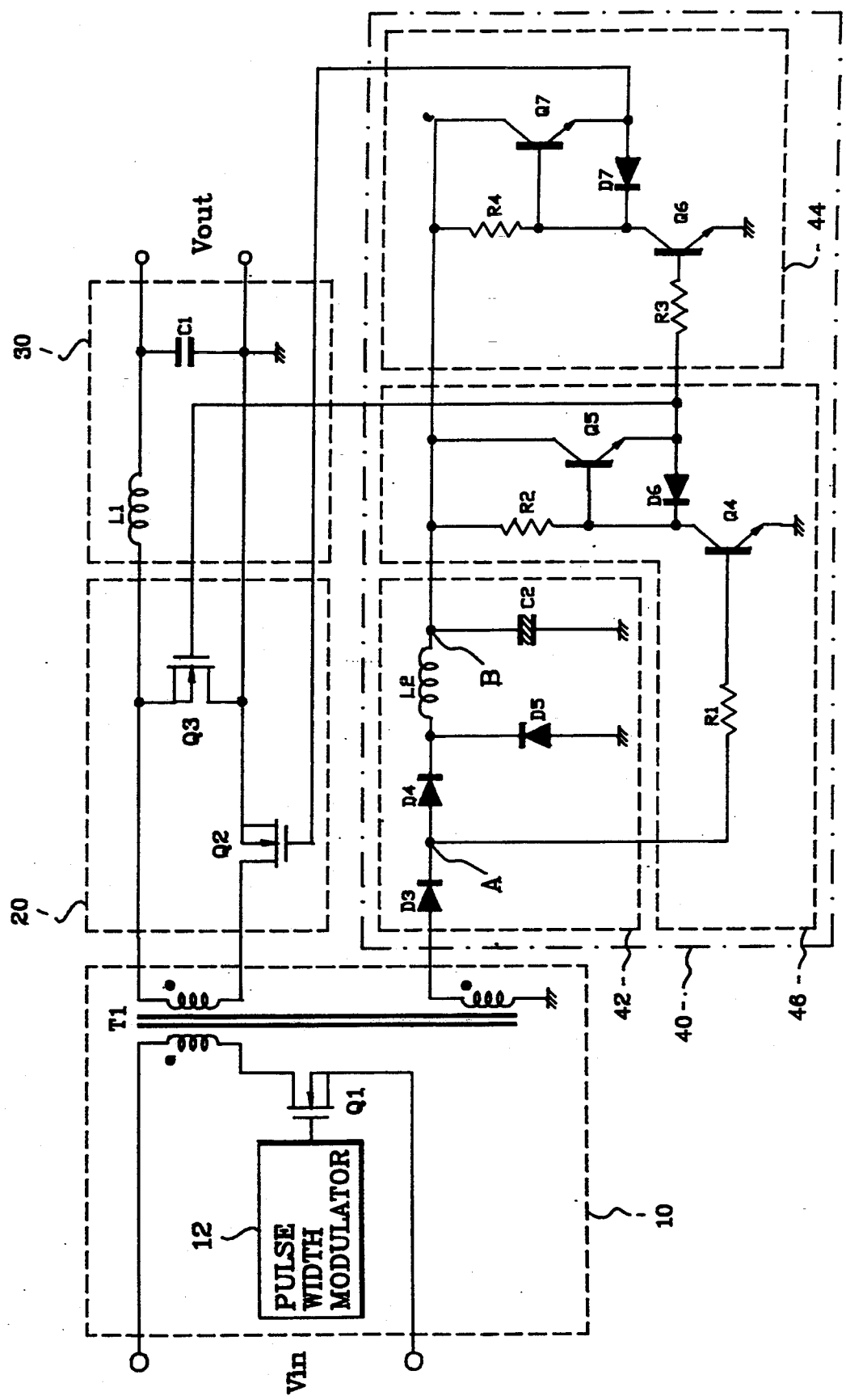
FIG. 3 illustrates an embodiment of the circuit of a power supply according to the present invention.

FIG. 3 illustrates a preferred embodiment of a circuit of a power supply according to the present invention.

Figure 1:
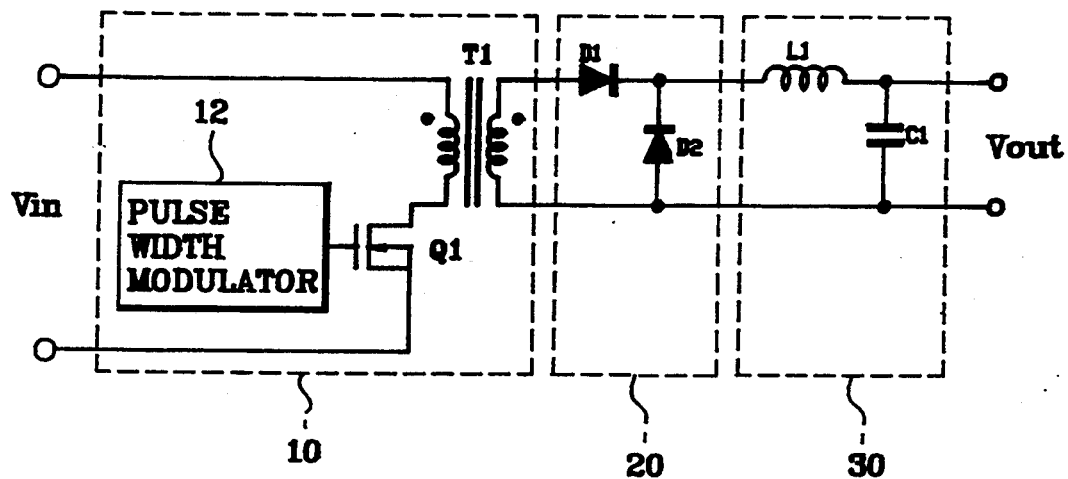
FIG. 1 illustrates a circuit of a conventional forward type power supply.
Figure 2:
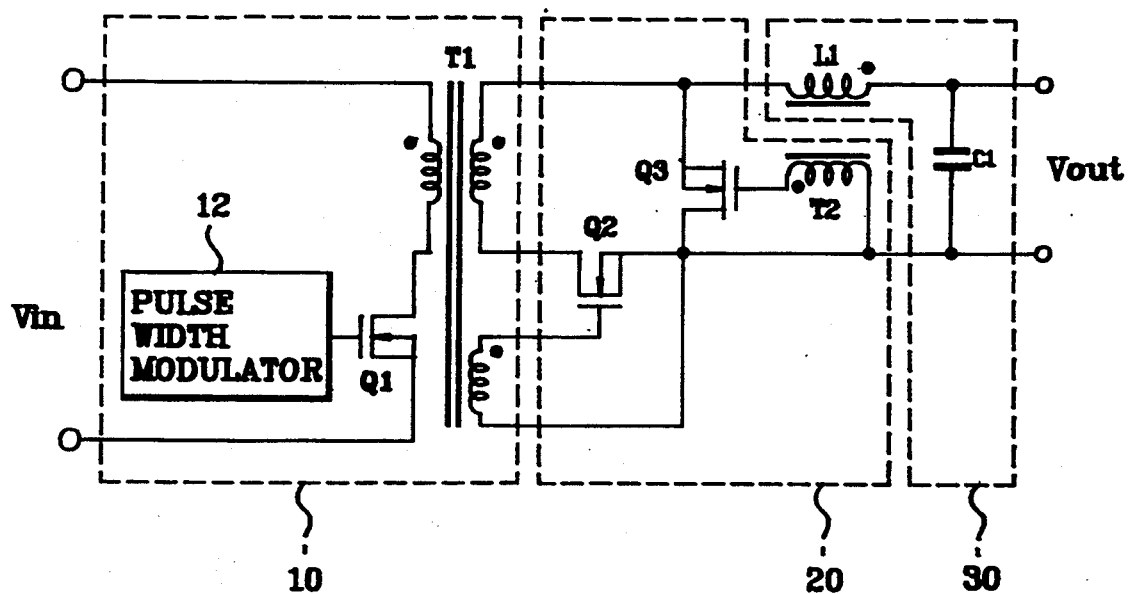
FIG. 2 illustrates a circuit of an example of conventional power supplies.

Referring to FIG. 3, there is added a switching control circuit 40 for controlling the switching operations of two switching MOS transistors Q2 and Q3 which are provided in the rectifying portion 20 of FIG. 2. Further, one end of a flattening capacitor C1 which is provided in a flattening portion 30 is grounded.

Meanwhile, the control circuit 40 includes: a first switching portion 44 for controlling the switching operations of the switching MOS transistor Q2; a second switching portion 46 for controlling the switching operations of the other switching MOS transistor Q3; and an auxiliary rectifying portion 42 for supplying a predetermined voltage to the first and second switching portions to drive them.

The auxiliary rectifying portion 42 includes: a tertiary coil for being induced from the primary coil of a transformer T1; two rectifying diodes D3 and D4 for rectifying the voltage induced on the tertiary coil; a voltage supplying diode D5 for supplying the average value of the outputs of the two rectifying diodes D3 and D4 to the rear portion; and a filter coil L2 and a flattening capacitor C2 for smoothing the output from the voltage supplying diode D5.

The first switching portion 44 is constituted such that: the gate of the switching MOS transistor Q2 is connected to two switching bipolar transistors Q6 and Q7 to alternately turn them on and off for controlling the operations of the switching MOS transistor Q2; the bases of the two bipolar transistors Q6 and Q7 are connected to voltage dividing resistors R3 and R4; and a synchronizing diode D7 is connected between the collector of the bipolar transistor Q6 and the emitter of the bipolar transistor Q7.

The second switching portion 46 is constituted such that: the gate of the transistor Q3 is connected to two switching bipolar transistors Q4 and Q5, the two transistors Q4 and Q5 being turned on and off in an alternate manner to control the operations of the switching MOS transistor Q3; the bases of the two switching bipolar transistors Q4 and Q5 are connected to voltage dividing resistors R1 and R2; and a synchronizing diodes D6 is connected between the collector of the bipolar transistor Q4 and the emitter of the bipolar transistor Q5.

The circuit of the present invention constituted as above will now be described as to its operations.

If the output pulse from the pulse width modulator 12 of the power supplying portion 10 is a high signal, the MOS transistor Q1 is turned on, while the power source voltage Vin which is supplied through the power supply terminal is induced from the primary coil of the transformer T1 to the secondary and tertiary coils of the same transformer. Under this condition, the wave pattern of the voltage which is supplied to the primary coil of the transformer T1 is as shown in FIG. 6B, and the wave pattern of the voltage which is induced on the secondary coil of the transformer T1 is as shown in FIG. 6C, while the wave pattern of the voltage induced on the tertiary coil of the transformer T1 is as shown in FIG. 6D.

The induced voltages are rectified by the two rectifying diodes D3 and D4 of the auxiliary rectifying portion 42, and an average value of the voltages which are supplied through the voltage supplying diode D5 is output. The average voltage is filtered by a smoothing filter which consists of a smoothing coil L2 and a smoothing capacitor C2. Then a part of the voltage is supplied to the base of the bipolar transistor Q7 (refer to FIG. 6F) through a resistor R4 of the first switching portion 44 so as to turn on the transistor Q7, while a part of the voltage is supplied to the collector of the bipolar transistor Q7.

Further, a part of the voltage is supplied to the base of the bipolar transistor Q4 (refer to FIG. 6E) through the resistor R1 of the second switching portion 46 to turn on the bipolar transistor Q4, while a part of the voltage is supplied to the base of the bipolar transistor Q5.

Further, the voltage which is rectified by the rectifying diode D3 is supplied to the base of the bipolar transistor Q4 through the resistor R1 so as to turn on the transistor Q4.

If the bipolar transistor Q4 is turned on, the voltage which is supplied to the base of the bipolar transistor Q5 is discharged to the ground to turn off the bipolar transistor Q5. The voltage which is supplied to the gate of the MOS transistor Q3 of the rectifying portion 20 is discharged to the ground through the synchronizing diode D6 so as to turn off the MOS transistor Q3.

Meanwhile, there is no voltage supplied to the base of the bipolar transistor Q6 of the first switching portion 44, and therefore, the transistor Q6 is maintained at turned-off state. Therefore, the voltage which is induced on the tertiary coil of the transformer T1 is supplied to the gate of the MOS transistor Q2 of the rectifying portion 20 through the bipolar transistor Q7 of the first switching portion 44 so as to turn on the MOS transistor Q2. The rest of the operations are same as described above referring to FIG. 2.

On the other hand, if the output pulse from the pulse width modulator 12 of the power supplying portion 10 is a low signal, the MOS transistor Q1 is turned off, with the result that the power source voltage Vin which is supplied through the voltage supplying terminal cannot be induced from the primary coil to the tertiary coil of the transformer T1.

As there is no voltage induced, the bipolar transistor Q4 of the second switching portion 46 is turned off, while the bipolar transistor Q5 is turned on by the bias voltage and by the voltage which has been charged into the filter capacitor C2. Further, a part of the charged voltage and the residue voltage of the filter coil L2 of the auxiliary rectifying portion 42 are supplied to the gate of the MOS transistor Q3 of the rectifying portion 20 to turn on the MOS transistor Q3, while a part of the voltages is supplied to the base of the bipolar transistor Q6 through the resistor R3 of the first switching portion 44 to turn on the transistor Q6.

If the bipolar transistor Q6 is turned on, the voltage which is supplied to the base of the bipolar transistor Q7 is discharged to the ground through the bipolar transistor Q6, thereby turning off the bipolar transistor Q7. Further, the voltage which is supplied to the gate of the MOS transistor Q2 of the rectifying portion 20 is discharged to the ground through the synchronizing diode D7 and the bipolar transistor Q6, thereby turning off the MOS transistor Q2.

The rest of the operations are same as described above referring to FIG. 2.

The on/off state of the switching OS transistors and the bipolar transistors in accordance with the output of the pulse width modulator can be summarized as follows.

| power | Q1 | Q2 | Q3 | Q4 | Q5 | Q6 | Q7 |
|---|---|---|---|---|---|---|---|
| High | on | on | off | on | off | off | on |
| Low | off | off | on | off | on | on | off |

Now other embodiments of the present invention will be described in detail referring to the attached drawings.

Figure 4:
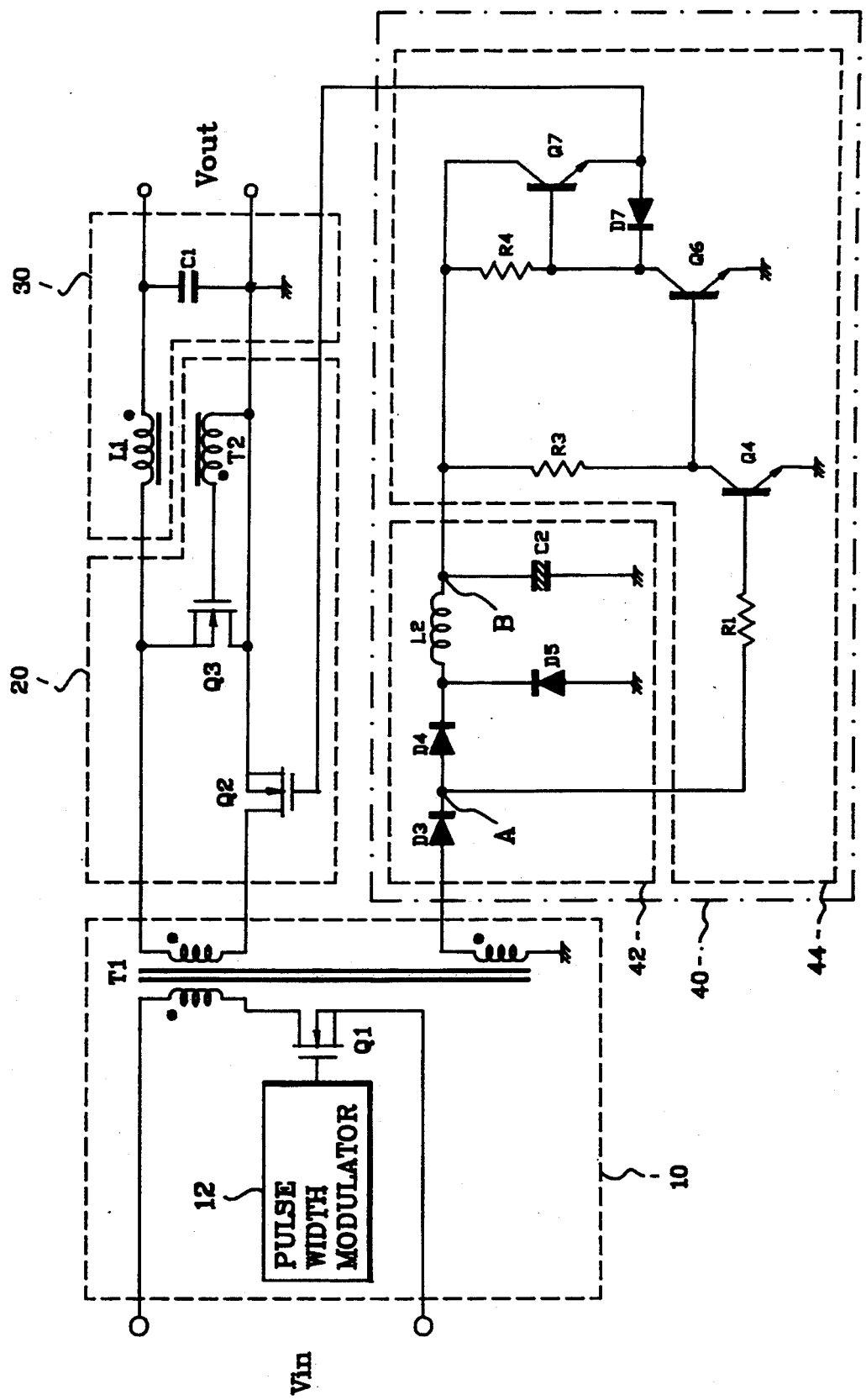
FIG. 4 illustrates another embodiment of a circuit of a power supply according to the present invention.
Figure 5:
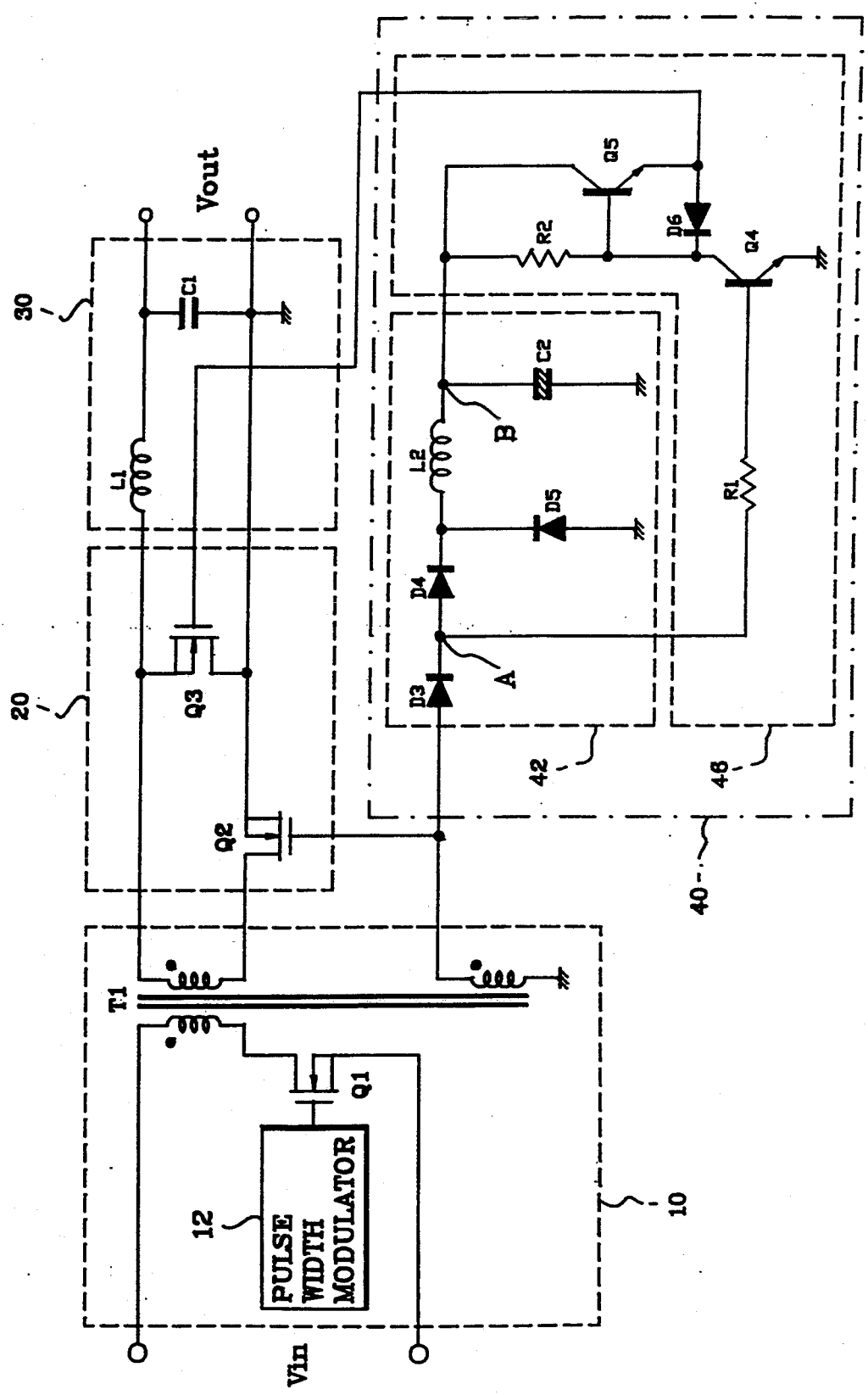
FIG. 5 illustrates still another embodiment of a circuit of a power supply according to the present invention.

FIG. 4 illustrates another embodiment of the power supply according to present invention, and FIG. 5 illustrates still another embodiment of the power supply according to the present invention. The descriptions of the constitution and function are skipped for the parts of FIGS. 4 and 5 which are same as those of FIGS. 2 and 3, while the same elements are assigned with the same reference codes.

Referring to FIG. 4, the second switching portion 46 of FIG. 3 is eliminated, and, in order to control the MOS transistor Q3 of the rectifying portion, there is used the auxiliary coil of FIG. 2.

This circuit will be described in more detail by defining the contents mentioned above. That is, the gate of the MOS transistor Q3 of the rectifying portion 20 is disposed adjacently to the filter coil L1 of the filter portion 30, and the gate of the MOS transistor Q3 is also connected to an auxiliary coil T2 for receiving the residue energy of the filter coil L1. Meanwhile, the auxiliary rectifying portion 42 of the switching control portion 40 is constituted in the sane form as that of FIG. 3.

The first switching portion 44 of the switching control circuit portion 40 is constituted such that: the gate of the MOS transistor Q2 of the rectifying portion 20 is connected to three switching bipolar transistors Q4, Q6 and Q7 which are alternately turned on and off to control the switching operations of the switching MOS transistor Q2; the bases of the three switching bipolar transistors Q4, Q6 and Q7 are connected respectively to voltage dividing resistors R1, R3 and R4; and a synchronizing diode D7 is connected between the collector of the bipolar transistor Q6 and the emitter of the bipolar transistor Q7.

The circuit constituted as above will now be described as to its operations.

First, if the output pulse from the pulse width modulator 12 of the power supplying portion 10 is a high signal, the MOS transistor Q1 is turned on, and therefore, the power source voltage Vin which is input through the power supplying terminal is induced from the primary coil to the secondary and tertiary coils of the transformer T1.

The induced voltages are rectified by two rectifying diodes D3 and D4 of the auxiliary rectifying portion 42, while there is output an average value of the voltages which are supplied through a predetermined voltage supplying diode D5. The voltage is filtered by a smoothing filter which consists of a filter coil L2 and a filter capacitor C2. A part of the voltage is supplied to the base of the bipolar transistor Q7 through the resistor R4 of the first switching portion 44 to turn on the bipolar transistor Q7, while the rest of the voltage is supplied to the collector of the bipolar transistor Q7.

The voltage which is rectified by the rectifying diode D3 is supplied to the base of the bipolar transistor Q4 through the resistor R1 to turn on the bipolar transistor Q4.

When the bipolar transistor Q4 is turned on, the voltage which is supplied to the base of the bipolar transistor Q6 is discharged to the ground to turn off the bipolar transistor Q6. Therefore, the voltage which is induced on the tertiary coil of the transformer T1 is supplied to the gate of the MOS transistor Q2 of the rectifying portion 20 through the bipolar transistor Q7 of the first switching portion 44, thereby turning on the MOS transistor Q2. The rest of the operations are same as described above referring to FIG. 2.

On the other hand, if the output pulse from the pulse width modulator 12 of the power supplying portion 10 is a low signal, the MOS transistor Q1 is turned off, with the result that the power source voltage Vin which is supplied through the power supply terminal is not induced from the primary coil to the secondary and tertiary coils of the transformer T1.

As there is no voltage induced, the bipolar transistor Q4 of the first switching portion 46 is turned off, while the bipolar transistor Q6 is turned on by the residue voltage of the filter coil L2 and the charged voltage of the filter capacitor C2 of the auxiliary rectifying portion 42.

If the bipolar transistor Q6 is turned on, the voltage which is supplied to the base of the bipolar transistor Q7 is discharged to the ground through the bipolar transistor Q6, thereby turning off the bipolar transistor Q7. Further, the voltage which is supplied to the gate of the MOS transistor Q2 of the rectifying portion 20 is discharged to the ground through the synchronizing diode D7 and the bipolar transistor Q6, thereby turning off the MOS transistor Q2.

Accordingly, the residue energy of the filter coil L1 of the filter portion 30 is induced to the auxiliary coil T2 of the rectifying portion 20, and this induced voltage is supplied to the gate of the MOS transistor Q3. The rest of the operations are same as described above referring to FIGS. 2 and 3.

Referring to FIG. 5, the first switching portion 44 of FIG. 3 is eliminated, and, in order to control the MOS transistor Q2 of the rectifying portion 20, the tertiary coil of the transformer T1 as described referring to FIG. 2 is added.

This circuit will now be described in more detail. That is, the gate of the MOS transistor Q2 of the rectifying portion 20 is disposed adjacently to the primary coil of the transformer T1 of the power supplying portion 10, and is connected to the tertiary coil of the transformer T1 for receiving the induced voltage. Meanwhile, the auxiliary rectifying portion 42 of the switching control circuit portion 40 is provided in the same form as that of FIG. 3.

The second switching portion 46 of the switching control circuit portion 40 is constituted such that: the gate of the MOS transistor Q3 of the rectifying portion 20 is connected to two switching bipolar transistors Q4 and Q5 which are alternately turned on and off for controlling the switching operations of the switching MOS transistor Q3; the bases of the two switching bipolar transistors Q4 and Q5 are connected to voltage dividing resistors R1 and R2; and a synchronizing diode D6 is connected between the collector of the bipolar transistor Q4 and the emitter of the bipolar transistor Q5.

The circuit constituted as above will now be described as to its operations.

First, if the output pulse from the pulse width modulator 12 of the power supplying portion 10 is a high signal, the MOS transistor Q1 is turned on, with the result that the power source voltage Vin which is supplied through the power supply terminal induces induction voltages on the secondary and tertiary coils of the transformer T1 simultaneously.

The induced voltages are rectified by the two rectifying diodes D3 and D4 of the auxiliary rectifying portion 42, and there is output an average value of the voltages which are supplied through the predetermined voltage supplying diode D5. Then the voltage is filtered by the smoothing filter which consists of a filter coil L2 and a filter capacitor C2. Then a part of the voltage is supplied to the base of the bipolar transistor Q5 through the resistor R2 of the second switching portion 46 to turn on the bipolar transistor Q5, while the rest of the voltage is supplied to the collector of the bipolar transistor Q5. Further, the voltage which is rectified by the rectifying diodes D3 is supplied to the base of the bipolar transistor Q4 through the resistor R1, thereby turning on the bipolar transistor Q4.

If the bipolar transistor Q4 is turned on, the voltage which is supplied to the base of the bipolar transistor Q5 is discharged to the ground, thereby turning off the bipolar transistor Q5.

Therefore, the voltage which is induced on the tertiary coil of the transformer T1 is not supplied to the gate of the MOS transistor Q3 of the rectifying portion, but is supplied to the gate of the transistor Q2 of the rectifying portion, thereby turning on the transistor Q2.

The rest of the operations are same as described above referring to FIG. 2.

On the other hand, if the output pulse from the pulse width modulator 12 of the power supplying portion 10 is a low signal, the MOS transistor Q1 is turned off, with the result that the power source voltage Vin which is input through the power supply terminal cannot induce induction voltages on the secondary and tertiary coils of the transformer T1.

Accordingly, as there is no voltage induced from the primary coil to the tertiary coil of the transformer TI, no voltage is supplied to the base of the bipolar transistor Q4, and therefore, the bipolar transistor Q4 is turned off.

If the bipolar transistor is turned off, a part of the charged voltage of the flattening capacitor C2 and the residue voltage of the filter coil L2 of the auxiliary rectifying portion 42 are supplied to the base of the bipolar transistor Q5 through the voltage dividing resistor R2 to turn on the bipolar transistor Q5, while the rest of the voltage is supplied to the collector of the bipolar transistor Q5.

Therefore, the voltage which is output from the auxiliary rectifying portion 42 is supplied to the gate of the MOS transistor Q3 of the rectifying portion 20, thereby turning on the MOS transistor Q3. The rest of the operations are same as described above referring to FIGS. 2 and 3.

The embodiments of FIGS. 4 and 5 are to be used in the case where only one of the MOS transistors Q2 and Q3 of the rectifying portion 20 is to be switched.

According to the power supply of the present invention as described above, a switching control circuit portion is provided which functions in such a manner that the switching MOS transistor of the rectifying portion should be switched in synchronization with the switching MOS transistor of the power supply portion. Thus, the switching operations of the switching MOS transistor are rendered more accurate, and the damage of the devices due to the, surge of an over-voltage can be prevented.

What is claimed is:

1. A control circuit for a power supply including a transformer converting a first DC voltage of a DC power source to an AC voltage under the control of a pulse width modulator and having primary, secondary and tertiary windings and rectifying means having a first and second field effect transistors for rectifying the AC voltage induced from the secondary winding of the transformer, said AC voltage from the secondary winding of the transformer being applied to both first and second field effect transistors, the control circuit comprising:

bias voltage generating means for rectifying the AC voltage from tertiary winding of the transformer to generate a second DC voltage and said bias voltage generating means charge the rectified second DC voltage when the AC voltage is induced in the tertiary winding, and discharges the charged second DC voltage in the absence of the AC voltage from the tertiary winding, to generate a stable bias voltage;

first switching means operated by said bias voltage when the AC voltage is output from the tertiary winding, for switching a pulse of predetermined voltage level provided to a gate of the first effect transistor; and second switching means operated by said bias voltage discharged from said bias voltage generating means when the AC voltage is not output from the tertiary winding, for switching a pulse of a predetermined voltage level provided to a gate of the second field effect transistor;

wherein said first and second switching means are selectively operated to provide a stable DC voltage.

2. A control circuit for a power supply as claimed in claim 1, wherein said bias voltage generating means comprises:

a plurality of diodes for rectifying the AC voltage induced in the tertiary winding of the transformer to generate the second DC voltage, and a low pass filter including a coil and a capacitor for smoothing the average value voltage, said low pass filter being charged by the rectified direct voltage when the AC signal is induced in the tertiary winding and discharged in the absence of the AC signal.

3. A control circuit for a power supply as claimed in claim 1, wherein said second switching means comprises:

a first bipolar transistor operated by a half-wave rectified signal from a first diode of said bias voltage means;

a second bipolar transistor for blocking the pulse voltage signal applied to the gate of the second field effect transistor under the control of said first bipolar transistor, and a synchronizing diode connected between an emitter and a base of said second bipolar transistor, said second bipolar transistor being turned off when the first bipolar transistor is turned on for blocking the pulse voltage signal applied to the gate of the second field effect transistor and turned on by the bias voltage discharged from the low pass filter of the bias voltage generating means when the first bipolar transistor is turned off, to apply the pulse voltage signal to the gate of the second field effect transistor, thereby providing a stable DC voltage.

4. A control circuit for a power supply as claimed in claim 1, wherein said first switching means comprises:

a third bipolar transistor operated by the voltage signal output from the second bipolar transistor of said second switching means;

a fourth bipolar transistor for blocking the pulse voltage signal applied to the gate of said first field effect transistor under the control of said third bipolar transistor, and a synchronizing diode connected between an emitter and a base of said fourth bipolar transistor, said fourth bipolar transistor being turned off for blocking the pulse voltage signal applied to the gate of said first field effect transistor under the control of said third bipolar transistor when the second bipolar transistor is turned on and said second field effect transistor is operated, and turned on by the bias voltage discharged from the low pass filter of said bias voltage generating means to apply the pulse voltage signal to the gate of the first field effect transistor when said second field effect transistor is not operated, to provide a stable DC voltage.

* * * * *